US012241006B2

(12) United States Patent
Frisco et al.

(10) Patent No.: US 12,241,006 B2
(45) Date of Patent: Mar. 4, 2025

(54) HIGH DENSITY POST ARRAYS

(71) Applicant: 3M INNOVATIVE PROPERTIES COMPANY, St. Paul, MN (US)

(72) Inventors: Sara Hemmer Frisco, Blaine, MN (US); Guy M. Kallman, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1041 days.

(21) Appl. No.: 17/261,063

(22) PCT Filed: Jul. 15, 2019

(86) PCT No.: PCT/IB2019/056034
§ 371 (c)(1),
(2) Date: Jan. 18, 2021

(87) PCT Pub. No.: WO2020/016754
PCT Pub. Date: Jan. 23, 2020

(65) Prior Publication Data
US 2021/0261828 A1    Aug. 26, 2021

Related U.S. Application Data

(60) Provisional application No. 62/701,107, filed on Jul. 20, 2018.

(51) Int. Cl.
*C09J 7/29* (2018.01)
*C09D 11/322* (2014.01)
*C09J 7/38* (2018.01)
*C09J 7/40* (2018.01)
*C09J 7/50* (2018.01)

(52) U.S. Cl.
CPC ............ *C09J 7/50* (2018.01); *C09D 11/322* (2013.01); *C09J 7/29* (2018.01); *C09J 7/385* (2018.01); *C09J 7/40* (2018.01); *C09J 2301/162* (2020.08); *C09J 2301/20* (2020.08); *Y10T 428/28* (2015.01); *Y10T 428/2843* (2015.01); *Y10T 428/2848* (2015.01)

(58) Field of Classification Search
None
See application file for complete search history.

(56) References Cited

U.S. PATENT DOCUMENTS

| | | |
|---|---|---|
| RE24,906 E | 12/1960 | Ulrich |
| 3,239,478 A | 3/1966 | Harlan |
| 3,935,338 A | 1/1976 | Robertson |
| 4,181,752 A | 1/1980 | Martens |
| 4,952,650 A | 8/1990 | Young |
| 5,141,790 A | 8/1992 | Calhoun |
| 5,169,727 A | 12/1992 | Boardman |
| 5,296,277 A * | 3/1994 | Wilson ............. C09J 7/38 428/161 |
| 5,425,977 A | 6/1995 | Hopfe |
| 5,623,010 A | 4/1997 | Groves |
| 5,677,376 A | 10/1997 | Groves |
| 6,565,697 B1 | 5/2003 | Maercklein |
| 8,313,822 B2 | 11/2012 | Hatakenaka |
| 9,240,131 B2 | 1/2016 | Onderisin |
| 9,555,602 B2 * | 1/2017 | Sherman ............ B32B 37/26 |
| 11,001,040 B2 * | 5/2021 | Alessandro ............ B32B 27/40 |
| 2002/0136851 A1 | 9/2002 | Kollaja |
| 2003/0054139 A1 * | 3/2003 | Ylitalo .............. G09F 13/16 428/195.1 |
| 2005/0003162 A1 | 1/2005 | Sakurai |
| 2006/0234076 A1 * | 10/2006 | Takamatsu ............ C08J 5/18 428/522 |
| 2007/0158259 A1 | 7/2007 | Ludwig |
| 2008/0299346 A1 | 12/2008 | Onderisin |
| 2014/0141214 A1 * | 5/2014 | Steelman ............ B41M 5/0047 428/207 |
| 2015/0218423 A1 | 8/2015 | Thebud |
| 2016/0108289 A1 | 4/2016 | Schneider |
| 2016/0222233 A1 * | 8/2016 | De Mondt ........... C09D 11/101 |
| 2021/0017426 A1 * | 1/2021 | Kallman .............. C09J 7/385 |
| 2021/0095166 A1 * | 4/2021 | Seth .................. C09J 7/26 |
| 2023/0374352 A1 * | 11/2023 | Kallman .............. B29C 59/04 |

FOREIGN PATENT DOCUMENTS

| | | |
|---|---|---|
| WO | WO 1997-018276 | 5/1997 |
| WO | WO 1998-015601 | 4/1998 |
| WO | WO 1998-029516 | 7/1998 |
| WO | WO 1999-003907 | 1/1999 |
| WO | WO 0069985 | 11/2000 |
| WO | WO 2006/036556 | 4/2006 |
| WO | WO 2007-079913 | 7/2007 |
| WO | WO 2007-079919 | 7/2007 |
| WO | 2013-019699 | 2/2013 |
| WO | WO 2014-197194 | 12/2014 |
| WO | WO 2019-193501 | 10/2019 |

OTHER PUBLICATIONS

Piezo Ink Jet Printing with 3M Piezo Ink Jet Ink Series 3700, Instruction Bulletin 4.25, Release H, effective Jan. 2002 (Year: 2002).*
International Search Report for PCT International Application No. PCT/IB2019/056034, mailed on Dec. 23, 2019, 4 pages.

\* cited by examiner

*Primary Examiner* — Anish P Desai
(74) *Attorney, Agent, or Firm* — Jeffrey M. Olofson

(57) ABSTRACT

A film-based article including a film layer having first and second major sides, an adhesive layer comprising a first surface adjacent to the second major side of the film and a second surface opposite the first surface, wherein the second surface of the adhesive layer comprises a structured surface comprising a plurality of outwardly extending protrusions, each having a base, wherein the bases of the plurality of protrusions comprise at least approximately 6 percent of a total surface area of the second surface of the adhesive layer, and an ink layer applied to the first major side of the film layer at an ink laydown of at least 100 percent.

12 Claims, 1 Drawing Sheet

HIGH DENSITY POST ARRAYS

TECHNICAL FIELD

The present invention relates generally to adhesive materials having positionable and repositionable bonding properties, and more specifically to adhesive materials having an array of structured adhesive surfaces.

BACKGROUND

Pressure sensitive adhesive (PSA) films are commonly applied to a wide variety of substrates for decoration, protection, or other purposes that involve modifying the aesthetic or functional properties of the underlying substrate. While it can be relatively easy to place small pieces of PSA film material on such substrates, it is much more difficult to accurately position larger PSA film materials, such as in the case of car wraps or fleet graphic installations.

In order to aid in the placement of larger sized PSA films, liquids such as water, detergent, and/or a surfactant or lubricant are known to be used between the PSA layer of a film and the substrate to which it will be applied. Although effective in some situations, this process is prone to a number of drawbacks, including difficulty in removing enough liquid to allow for proper adhesion of the film and unintentional damage to surrounding materials caused by excess liquids.

Modification of the exposed adhesive surface of certain PSA materials is another approach employed to allow for repositioning relative to an underlying substrate. For example, discontinuous coatings of non-adhesive materials that extend beyond a PSA layer can prevent initial adherence of the PSA to the substrate; however, the actual adherence of the adhesive to the substrate is also blocked by the non-PSA extensions. Other surface modifications to films having non-adhesive portions have also been used that result in the similar difficulty in balancing repositionability during placement with final adherence of the film material.

Other adhesive materials are available with topologically structured adhesive surfaces, such as the adhesive pegs provided by the graphic film materials commercially available from the 3M Company of St. Paul, Minnesota under the trade designation "Controltac." Such materials are effective for many applications; however, there is a continued need to provide structured pressure sensitive adhesive patterns useful for certain applications such as car wraps and fleet graphic installations that enable desired sliding properties for ease of installation while maintaining its chemical properties and mitigating effects of solvent migration that can occur in some structured adhesive patterns.

SUMMARY

Film materials are provided herein that have a structured adhesive surface including extending posts and/or recessed channels on one side of a film layer to provide a material that is easily repositionable during application and that can be securely and/or permanently attached to a substrate once it is positioned in its desired location. This is accomplished even with films that are printed with an ink laydown using solvent inks. The array of posts can be relatively dense, which decreases the amount of initial tack due to the fewer areas of exposed adhesive contacting the substrate. With this dense array of posts, the bulk chemistry of the adhesive remains unchanged and continues to build overtime the same as with or without the post features. In accordance with embodiments described herein, it is possible to have a controllable decreased initial tack while maintaining the same adhesion build overtime.

Further, by varying the geometries and densities of posts, the slideability performance can be manipulated and controlled. The slideability of a graphic is evaluated when first applying the adhesive to a substrate. Slideability allows for the graphic to slide around at least somewhat freely on the substrate before actually being applied and tacked down to the substrate. In some cases, beads are incorporated into the posts to achieve more slide by having less contact points of the available flat adhesive. Also, by having a relatively dense post array pattern, the posts create a more rigid structure in the adhesive which allows for an increase in slide. This behavior is further confirmed when solvent printing on the graphic film. In some instances, solvent printing can lead to a decrease in slide performance because of its interaction with the adhesive. The relatively dense post array patterns provided herein help to mitigate the decrease in slide performance when printed due to its rigidity and further show improvements in slide.

It has further been found that repositionability allows the graphic films described herein to be applied and then lifted up and repositioned on the substrate. In conventional repositionable graphic films, repositionability changes are achieved in changing the bulk modulus of the adhesive chemistry. However, with the denser post array patterns provided herein, repositionability can be changed and further improved without making changes to the adhesive chemistry. More dense post arrays allow the material to be repositioned easier due to its increased rigidity, slideability and lower initial tack. In addition, In addition, relatively dense post arrays can provide a more desirable level of "snap up" of the graphic film after adhered to the substrate, which occurs when an installer lifts the material relatively quickly after a large area has been applied to the substrate.

In accordance with the film materials described herein, an embodiment of a film-based article comprises a film layer having first and second major sides, an adhesive layer comprising a first surface adjacent to the second major side of the film and a second surface opposite the first surface, wherein the second surface of the adhesive layer comprises a structured surface comprising a plurality of outwardly extending protrusions, each having a base, wherein the bases of the plurality of protrusions comprise at least approximately 6 percent of a total surface area of the second surface of the adhesive layer, and an ink layer applied to the first major side of the film layer at an ink laydown of at least 100 percent.

The ink layer of the film-based article may include a solvent-based ink, and the ink layer may be applied to the first major side of the film layer at an ink laydown of at least 150 percent, or of at least 200 percent, or of at least 250 percent. The ink layer may be constructed of at least two different pigments, or of at least three different pigments, or of at least four different pigments.

The film layer may be at least one of optically clear, transparent, translucent, opaque, and colored. The film layer includes at least one of vinyl, polyvinyl chloride, plasticized polyvinyl chloride, polyurethane (PU), polyethylene, polypropylene, fluororesin, polyethylene terephthalate (PET), polyethylene terephthalate glycol (PETG) polymethylmethacrylate (PMMA), polycarbonate (PC), and acrylonitrile butadiene styrene (ABS). The film layer may include one or multiple material layers, wherein at least one of the multiple material layers may be a primer material. The film-based article may include an overlaminate layer adjacent to an outer surface of the ink layer.

In accordance with the film materials described herein, the bases of the plurality of protrusions of an embodiment comprise between approximately 9 percent and approximately 25 percent of the total surface area of the second surface of the adhesive layer. In accordance with the film materials described herein, the bases of the plurality of protrusions of an embodiment comprise between approximately 16 percent and approximately 20 percent of the total surface area of the second surface of the adhesive layer.

In accordance with the film materials described herein, the second surface of the adhesive layer of an embodiment further comprises at least one channel, and the at least one channel may comprise an array of channels that may be irregular.

In accordance with the film materials described herein, the plurality of protrusions of an embodiment comprises at least one protrusion having a height that is the same as the height of at least one additional protrusion, and/or at least one protrusion having a height that is different from a height of at least one additional protrusion.

In accordance with the film materials described herein, an embodiment of a film-based article comprises a film layer having first and second major sides, an adhesive layer comprising a first surface adjacent to the second major side of the film and a second surface opposite the first surface, wherein the second surface of the adhesive layer comprises a structured surface comprising a plurality of outwardly extending protrusions, each having a base, wherein the bases of the plurality of protrusions comprise at least approximately 6 percent of a total surface area of the second surface of the adhesive layer, and a solvent-based ink coating applied to the first major side of the film layer.

Film-based articles of the invention may be applied to a substrate using a method comprising the steps of: positioning a film-based article adjacent to an outer surface of a substrate, wherein the film-based article comprises a film layer having first and second major sides, an adhesive layer comprising a first surface adjacent to the second major side of the film and a second surface opposite the first surface, wherein the second surface of the adhesive layer comprises a structured surface comprising a plurality of outwardly extending protrusions, each having a base, wherein the bases of the plurality of protrusions comprise at least approximately 6 percent of a total surface area of the second surface of the adhesive layer, a release liner adjacent to the second surface of the adhesive layer, and an ink layer applied to the first major side of the film layer at an ink laydown of at least 100 percent; removing the release liner from the second surface of the adhesive layer; and applying the second surface of the adhesive layer to the outer surface of the substrate.

BRIEF DESCRIPTION OF THE DRAWINGS

The present invention will be further explained with reference to the appended Figures, wherein.

DETAILED DESCRIPTION

In accordance with embodiments described herein, structured pressure sensitive adhesive (PSA) patterns are provided for film materials, such as vinyl, that can be used for application of the film material in the form of car wraps and fleet graphic installations, for example. The film materials with such structured PSA patterns can enable desired sliding properties for ease of installation while maintaining the chemical properties and mitigating effects of solvent migration that can occur in some printed structured adhesive patterns. Exemplary uses of the film-based articles described herein include vehicle wrap, medical tapes, graphic material for signage, structural tapes, and/or tapes for industrial and/or commercial applications, and the like. The film-based articles can vary in size and can be applied to all or only a portion of a particular substrate.

The film-based articles described herein include a film-based article printed with a solvent-based ink and have at least one topologically structured adhesive surface and a backing. The structured adhesive surface permits weak initial adherence or tack of the sheet to a substrate, thus permitting relatively easy repositioning as needed, while also allowing for a strong, permanent bond to the substrate to which it is applied by compressing the protrusions until the underlying base adhesive surface contacts the substrate. The structured adhesive surface includes a distribution of adhesive protrusions that protrude or extend outwardly from the adhesive surface. The protrusions will be exposed by removing a liner sheet or layer when it is desired to adhere the article to a substrate. The protrusions may comprise the same adhesive material as the underlying adhesive layer. In some instances, the protrusions may comprise a different adhesive material than the underlying adhesive layer. In some instances, the protrusions may contain non-adhesive materials, such as particles or beads, which provide a non-tacky or non-adhesive surface to initially contact a substrate that the film is applied to, thus allowing the film to "slide" across the surface.

The protrusions can be distributed and arranged to make-up between approximately 9 percent and approximately 25 percent, or more preferably between approximately 16 percent and approximately 20 percent at their bases of the total adhesive area. To arrive at these percentages, the approximate area of all the bases of the protrusions in a representative area are added together and compared to the overall size of the representative area. The protrusions can have an average height of approximately 8 microns to 30 microns, for example.

Figure 1:
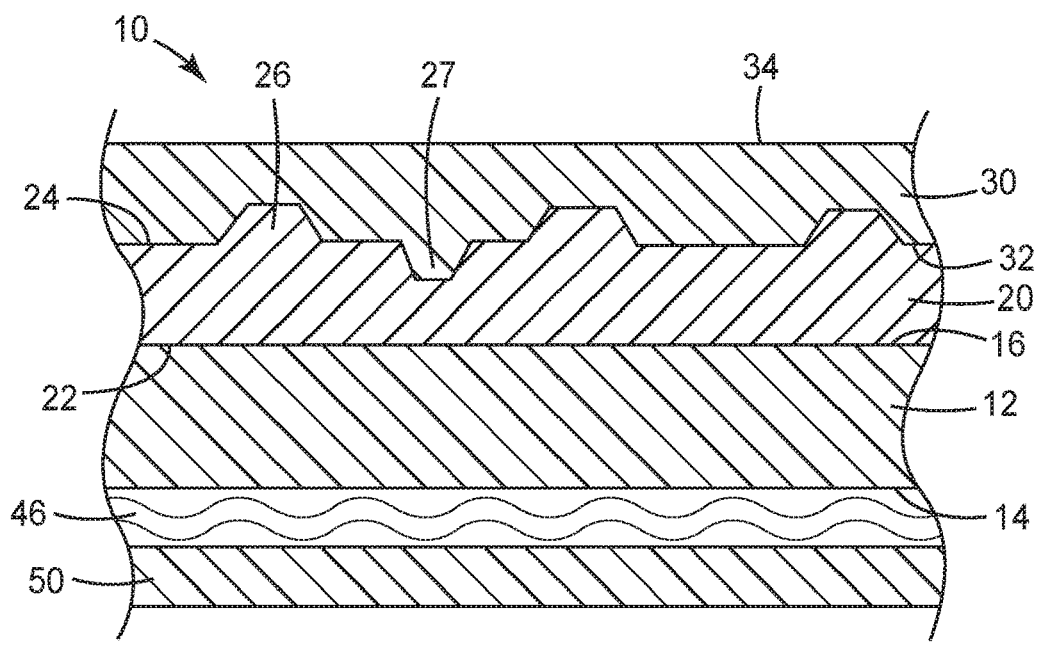
FIG. 1 is a cross-sectional side view of an embodiment of a film-based article, illustrating an exemplary structured surface including multiple protrusions and one channel.

Referring now to the Figures, and initially to FIG. 1, an exemplary embodiment of a film material or film-based article 10 is illustrated, which generally includes: a film layer 12 having a first side 14 and a second side 16; an adhesive layer 20 having a first side 22 adjacent and bonded to the second side 16 of film layer 12, and an opposite second side 24; a release liner 30 having a first side 32 releasably attached to the second side 24 of adhesive layer 20 and a second side 34, an ink layer 46 adjacent to the film layer 12, and an overlaminate layer 50 adjacent to the ink layer 46. The adhesive layer 20 is a pressure-sensitive adhesive that includes multiple protrusions 26 and at least one optional channel 27. The release liner 30 includes channels or depressions into its first side 32, which are used to form the corresponding protrusions 26 extending from the adhesive layer 20. The release liner 30 further includes protrusions from its first side 32, which are used to form the corresponding channels 27 in the adhesive layer 20. The release liner 30 is further used to protect the underlying adhesive layer 20 and its corresponding protrusions 26 at any time prior to application of the film-based article 10 to a substrate. The release liner 30 is partially or completely removable from the adhesive layer 20 prior to the article 10 being applied to a substrate.

Film layer 12 can be conformable or non-conformable, but preferably is a conformable or compliant film material with an elongation level of at least 50% and that includes one or more layers. As used herein, the term "conformable" generally refers to a film that can materially or completely take on the shape of a three-dimensional substrate containing convex features, concave features, and/or other shapes or contours. However, the determination of the conformability of a film is not limited to situations in which is it actually applied to such a substrate, but also that the film has this capability prior to being applied to a substrate. In some embodiments, taking on such shape is possible without undesired changes to the structural integrity and/or the aesthetic appearance of the film. In this sense, conformable films are distinguishable from non-conformable films that may be capable of being applied to planar surfaces and/or curved slightly around surfaces that have a sufficiently large radius of curvature (such as a large cylinder), but which are not possible to apply to (and conform to the surfaces of) a more complicated three-dimensional substrate.

Factors that can influence the conformability of a film include the identity of the material used to make the film, the molecular weight of such material, the conditions to which such film is subjected (e.g., temperature, radiation exposure, and humidity), and the presence of additives in the film material (e.g., plasticizer content, reinforcing fibers, pigments, stabilizers (e.g., UV stabilizers), and hardness enhancing particles).

The film layer 12 utilized in embodiments described herein is generally made of various plastic materials used by those skilled in the art. Suitable film layers include, for example, film layers that provide some optical property to the finished construction, such as reflected or transmitted color, opacity, retroreflectivity, clarity, diffusivity, print receptivity, printed images and patterns. Chemistries for the film layers in the 25-300 µm range may include plasticized PVC film layers (both cast and calendared), urethanes, cellulosics, acrylics, olefins, polyesters and blends thereof. The film layers could be primed with an appropriate primer, such as a nitrogen rich polymer like an acrylic co-polymer, poly-amide or urethane. The primer may or may not be crosslinked via an appropriate chemistry such as epoxy, melamine or isocyanate. The film layer thickness can vary widely according to a desired application, but is usually within a range from about 300 µm or less, and preferably about 25 µm to about 100 µm. The film layer can be optically clear or transparent such that light can pass through it and objects behind the layer can be distinctly seen, translucent such that light, but not detailed images, can pass through it (i.e., semi-transparent), opaque such that it is not able to be seen through (i.e., not transparent), and/or colored across its area.

A specific example of a suitable film layer is a plasticized polyvinyl chloride film, and has sufficient inelastic deformation after being stretched so that when stretched, the film does not recover to its original length. Preferably, the film layer has an inelastic deformation of at least 5% after being stretched once to 115% of its original length. A typical formulation of a vinyl film includes polyvinyl chloride resin, light and/or heat stabilizer(s), plasticizer, and optionally, pigment. The amount of plasticizer can be less than about 40% by weight, and is preferably composed of polymeric non-migratable plasticizers which are compatible with the vinyl film and provide the desired flexibility and durability. One suitable plasticizer is a combination of polymeric polyester elastomer and an ethylene vinyl acetate copolymer (such as Elvaloy 742 made by DuPont Co.) soluble in aromatic solvents and present in amounts of about 26 parts and 10 parts, respectively, per 100 parts vinyl resin.

Nonlimiting examples of film layers useful for the present invention may be thin or thick plastic (synthetic or natural), reflective sheeting, fabrics (woven or nonwoven), papers, metal foils, composite release liners and the like. The film layer may be constructed such that the resulting article is a graphic article, a transfer tape, a double-sided tape, an awning, and the like. Furthermore, the film layer may include additional functional and decorative layers, such as clear coats, decorative graphics, dirt and weather resistant coatings, art known adhesive layers, screen printable inks, barrier layers, adhesion promoters, multilayers of translucent films and the like. Such functional and decorative layers are known in the art and may be used, applied or laminated according to techniques known to those skilled in the art.

One or more primer layers may optionally be used to enhance the bond between the film layer and the adhesive layer. The type of primer will vary with the type of film and adhesive used and one skilled in the art can select an appropriate primer. Examples of suitable primer layers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. Typically, primers are dispersed into an adequate solvent in very low concentrations, e.g., less that about 5% solids, and coated onto the film, and dried at room or elevated temperatures to form a very thin layer. Typical solvents used may include water, heptane, toluene, acetone, ethyl acetate, isopropanol, and the like, used alone or as blends thereof.

In accordance with embodiments of the film article, the pressure sensitive adhesive layer may include adhesives such as those that are capable of retaining protrusions extending from an exposed surface after being formed with a molding tool, backing or liner, or after being coated on a molding tool, backing or liner from which it is subsequently removed. The particular pressure sensitive adhesive selected for a given application is dependent upon the type of substrate to which the article will be applied and the method employed in producing the adhesive-backed article. Additionally, useful structured pressure sensitive adhesives should be capable of retaining their structured surfaces for a time sufficient to allow utilization of the adhesive-backed article.

Pressure-sensitive adhesives are adhesives that in dry (substantially solvent-free except for residual solvent) form are aggressively and in some instances permanently tacky at room temperature (e.g., approximately 15 degrees to approximately 25 degrees C.) and firmly adhere to a variety of dissimilar surfaces upon mere contact without the need for more than manual pressure. The adhesives require no activation by water, solvent or heat in order to exert a strong adhesive holding force towards such materials as paper, cellophane, glass, plastic, wood, painted surfaces, and metals. Pressure-sensitive adhesives are generally chemically composed of rubber-resin materials, acrylic resins, polyurethane resins, silicone resins, and the like. Non-pressure-sensitive adhesives, thermally-activated or solvent-activated adhesives may be used if they can display certain elastic elongation properties.

Many types of pressure-sensitive adhesives may be useful for the film-based article 10. The adhesive used can be selected based upon the type of substrate to which it will be adhered. Classes of pressure-sensitive adhesives include acrylics, tackified rubber, tackified synthetic rubber, ethylene vinyl acetate, silicone, and the like. Suitable acrylic adhesives are disclosed, for example, in U.S. Pat. Nos. 3,239,478, 3,935,338, 5,169,727, RE 24,906, 4,952,650, and 4,181,752. A preferred class of pressure-sensitive adhesives are the reaction product of at least alkyl acrylate with at least one reinforcing co-monomer. Suitable alkyl acrylates are those having a homopolymer glass transition temperature below about-10 degrees C. and include, for example, n-butyl acrylate, 2-ethylhexylacrylate, isoctylacrylate, isononlyl acrylate, octadecyl acrylate and the like. Suitable reinforcing monomers are those having a homopolymer glass transition temperature about-10 degrees C., and include for example, acrylic acid, itaconic acid, isobornyl acrylate, N,N-dimethylacrylamide, N-vinyl caprolactam, N-vinyl pyrrolidone, and the like.

The adhesive layer may comprise polymers that are dispersed in solvent or water and coated onto the release liner and dried, and optionally crosslinked. The drying process may include one or more of air drying, oven drying, and UV curing, depending on the material. If a solvent-borne or waterborne pressure-sensitive adhesive composition is employed, then the adhesive layer generally undergoes a drying step to remove all or a majority of the carrier liquid. Additional coating steps may aid in achieving a smooth surface. The adhesives may also be hot melt coated onto the liner or structured backing. Additionally, monomeric pre-adhesive compositions can be coated onto the liner and polymerized with an energy source such as heat, UV radiation, e-beam radiation.

Where relatively thick pressure-sensitive adhesive coatings are desired, it may be desirable either to apply multiple layers of the adhesive or to photopolymerize an adhesive in situ. For example, mixtures of monomeric alkyl acrylates, copolymerizable monomers, such as acrylic acid and optionally, polymers can be copolymerized by exposure to ultraviolet radiation to a pressure-sensitive adhesive state.

In an exemplary fabrication of a film-based article 10, adhesive layer 20 is coated onto liner 30 so that the adhesive mixture flows into depressions in the liner surface that correspond with the protrusions 26 that will be formed. Film layer 12 is then laminated to the adhesive layer 20. Although film layer 12 is illustrated as a single ply, it can instead be comprised of multiple plies or layers of thermoplastic materials, additional adhesive layers, primer layers, protective coatings, barrier layers, and any other structures and combination of structures known to those skilled in the art, such as sign sheeting, transfer or release liners, transfer tapes, adhesive-coated film foams, woven and non-woven sheets, paper, and metal foils.

Figure 2:
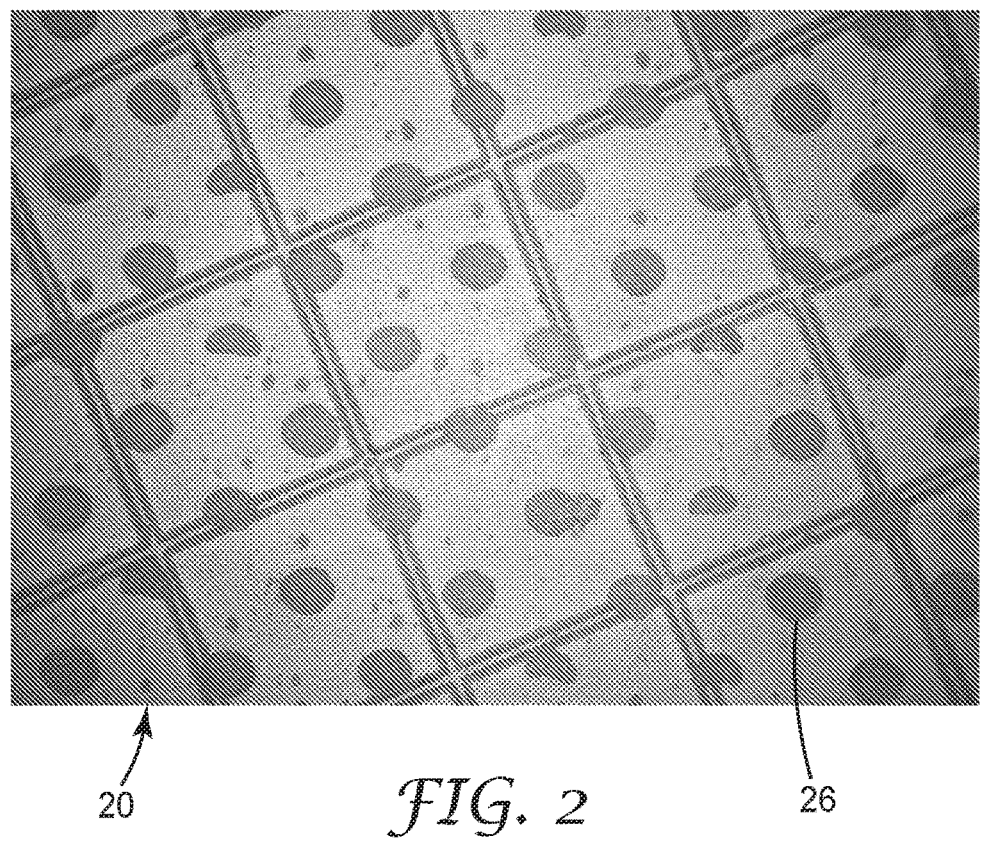
FIG. 2 is a topographical view of an embodiment of a structured pressure sensitive adhesive layer including an array of adhesive posts.

Referring also to FIG. 2, an embodiment of an adhesive layer of an adhesive film backing or layer is illustrated. As shown, multiple protrusions 26 are relatively uniformly distributed on the functional portion of the adhesive layer surface 20, although in some instances the protrusions 26 are arranged in a pattern that includes more and less dense areas, random distributions, and the like. The protrusions 26 can be shaped such that the cross section of a protrusion taken in a plane parallel to the adhesive layer may be oval, circular, polygonal, rectangular, star-shaped, annular, irregular, and any combination thereof. The bases of these protrusions 26 are considered to be the part of the protrusions that is directly adjacent to the adhesive layer surface 20.

FIG. 1 illustrates the protrusions as having a relatively flat top; however, the top surface of the protrusions may instead be curved, contoured, or irregular, and may include beads that provide a textured type of top surface for the protrusions. In embodiments, an inside angle between the top and the sides of a protrusion 26 is preferably no greater than 150 degrees, and more preferably between 90 degrees and 135 degrees. In embodiments, the size and shape of the protrusions closely match the mold or tool that modifies the surface of the liner; however, in other embodiments, the adhesive does not completely fill in the recessed areas during formation, thereby creating a material with protrusions that generally match the shape of the mold or tool, but that also have differences.

The average height of an array of protrusions over the adhesive surface can be at least 12 µm as measured from the adhesive surface from which the protrusions extend the point or general area of the protrusion that is furthest from the adhesive surface. The protrusions generally have a maximum height of 200 µm, preferably 150 µm, and more preferably 50 µm. The height may vary, but the height variation is preferably random, as it can be undesirable to have a number of shorter protrusions grouped together. In addition, the average height of protrusions 26 is approximately 15 µm, thus taking into account height variations within the individual protrusion. However, the height and the inside angle is, in part, a function of the adhesive composition selected for use in practicing the present invention. Although the protrusion heights are preferably uniform, it is contemplated to have a plurality of protrusions having fabrication height variances. It is also contemplated to have a plurality of protrusions having a predetermined height variance, advantageously further controlling positionability and/or repositionability.

Typically, the protrusions can be formed by directly coating an adhesive onto a structured liner. In the case of composite protrusions, the protrusions can be formed by direct coating of adhesive onto a structured liner in which small depressions have been previously filled with beads and optionally, a functionally sufficient amount of polymeric binder. Alternatively, the composite protrusions can be formed with a first pass coating of an adhesive/bead slurry, followed by an adhesive only coating. The second, adhesive only coating could be a chemically different adhesive provided the second adhesive is sufficiently compatible with the first pass coating adhesive. This is generally useful to keep the protrusions on the adhesive (second coating) surface after the liner is removed during application. As shown in FIG. 2, the shapes of the protrusions 26 can be either circular or irregular depending on whether a portion of the adhesive or beads are left in the depression in the liner when the liner is removed from the adhesive and/or whether the adhesive coated on the liner fully filled the depression during the filling process.

Although the protrusions described herein can be made entirely of adhesive, they may instead be composed of a composite of adhesive and beads, with beads being substantially covered by adhesive. In some instances a small portion of the beads may be above or below the surface and not covered by the adhesive, provided the overall surface of the protrusion provides an adhesive surface.

When the film-based article of the present invention is used for decorative purposes, the beads preferably are substantially smaller than the thickness of the adhesive layer so that after being pressed into the adhesive layer, the beads do not mar the exposed face of the backing. For example, when the adhesive layer is approximately 20-40 µm thick, each of the beads is preferably less than 20 µm in average diameter, preferably from 1 to 15 µm in average diameter, and more preferably from 1 to 10 µm in average diameter. The beads within such a group may be the same or a mixture of sizes. Beads smaller than approximately 0.5 µm may be more difficult and expensive to use than larger particles. In non-decorative uses such as masking tape, the beads can exceed the thickness of the adhesive. It is also possible to prepare composite protrusions by first coating an embossed liner with a latex resin to partially fill the depressions, wiping the surface of the liner and allowing resin to dry or coalesce. The dried or coalesced resin is then overcoated with an adhesive solution.

Typically, the protrusions can be formed by directly coating an adhesive onto a structured liner. In the case of composite protrusions, the protrusions can be formed by direct coating of adhesive onto a structured liner, in which small depressions have been previously filled with beads and optionally, a functionally sufficient amount of polymeric binder. Alternatively, the composite protrusions can be formed with a first pass coating of an adhesive/bead slurry, followed by an adhesive only coating. The second, adhesive only coating could be a chemically different adhesive provided the second adhesive is sufficiently compatible with the first pass coating adhesive. This can be important to keep the protrusions on the adhesive (second coating) surface after the liner is removed from the film-based article during application.

One method for preparing the film-based articles comprising composite protrusions includes the following steps: (a) preparing a slurry of beads; (b) coating the slurry onto an embossed liner to fill depressions in the embossed liner; (c) wiping the embossed liner to remove excess slurry; and (d) coating the filled embossed liner with an adhesive solution and; (e) allowing the adhesive solution to adsorb into and around the beads before drying. The adhesive solution can be a latex adhesive solution or a solution containing reactive monomers.

A preferred liner for a film-based article of the invention is a low adhesion surfaced polymeric plastic film. The liners can be protective liners, release liners, and the like. When the film-based article is made by the first of the above-outlined methods, the plastic film can be embossed to form the depressions. The embossable plastic film can be self-supporting, but a preferred liner is kraft paper, one or more surfaces of which has a thin, embossable polyethylene coating that is covered by a silicone release coating. Useful self-supporting plastic films include but are not limited to plasticized poly(vinyl chloride) and biaxially oriented poly (ethylene terephthalate) and polypropylene, all of which are economical and have good strength, toughness, and dimensional stability. Preferably, depression shapes within the embossed liner are typically a truncated cone having an essentially flat bottom.

The film-based articles described herein may be provided in a sheet, a roll, or another desired configuration. The film can be printed with any number of different kinds of inks to provide ink layer 46 of the film-based article 10, such as an exemplary solvent-based ink, as will be described below, which can be provided as an ink laydown of at least 45%, for example (i.e., ink lay down is a percentage of ink over a given area, wherein the ink is made of a solvent based pigment construction that equals 45%). This printing may occur prior to or after an adhesive layer is laminated to the film. In general, providing a larger number of protrusions can mitigate the effects of solvent migration that influence the slide and tack of the adhesive, wherein more ink laydown generally makes the adhesive of the film-based article more tacky.

As used herein, the concept of ink laydown in digital print generally refers to the amount of ink being used to make a color. In more particularity, there are four main process colors (black, cyan, magenta, and yellow), each of which can be printed from 0-100%. By mixing the process colors, it is possible to achieve ink laydowns of more than 100%. The actual volume of ink that is laid down varies from printer to printer, wherein the ink laydown is the specified color in the image file that is then processed through software that is converted to machine language and sent to the printer. In that conversion, the called-out color in the design is then referenced to the color output/mixing tables of the printer, and that color management process will determine the ink laydown to achieve specified colors.

In an embodiment of the film-based articles provided herein, the release liner includes an exemplary surface depression area coverage of 16% and depressions of 28900/$in^2$ (4480/$cm^2$) at a density of 170 lines per inch (67 lines per cm). This produced an array of surface protrusions with 60 degrees draft angle in a square lattice with 390 microns spacing and 13~14 microns in height and 40 microns in width on the particle filled side of the release liner.

An overlaminate layer 50 such as a film commercially available from the 3M Company of St. Paul, Minnesota under the trade designation "Scotchcal," may be laminated to the film side of the overlaminated printed structured film to provide an embodiment of the film constructions described herein. In general, an overlaminate layer can be a film that protects ink layer printed on the vinyl from UV, scratches and weathering. The overlaminate layer can improve the appearance, performance and durability of a graphic film.

Embodiments of the film-based articles 10 provided herein additionally include channels 27 that allow some degree of egress for air or fluid trapped between the adhesive and the surface of the substrate to which the article 10 is applied. The channels 27 can be considered to be part of the structured surface which defines channels in a pressure sensitive adhesive with specific characteristics to allow for such an egress of air or fluid. As such, the channels in the adhesive of embodiments of the article provided herein have specific dimensions and characteristics to improve air/fluid egress that includes channels or channel segments that do not necessarily terminate at the periphery of the film article.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes and are not meant to limit the scope of the appended claims.

Films with various post (protrusion) contact areas were prepared and printed with different ink laydown levels. The ability of the samples to slide across a surface was evaluated. All parts, percentages, ratios, etc. in the examples and the rest of the specification are by weight, unless noted otherwise. The following abbreviations are used herein: in/min=inch/minute; sec=second; cm=centimeters; in=inch; lb=pound; Kg=kilogram; °C.=degrees centigrade; RH=Relative Humidity.

Materials

| Abbreviation | Description |
|---|---|
| A1 | An acrylic pressure sensitive adhesive solution (described as Adhesive Solution 1 in U.S. Pat. No. 5,296,277 (Wilson et al.) and containing 0.15 parts of bis amide and 16 parts of tackifier) prepared at a solids content of 38.5%. The tackifier used was Terpene Phenol, available from Kraton Corporation Houston, TX as "SYLVARES" TP2019 |
| L1 | Particle filled, Embossed Release Liner as described in U.S. Pat. No. 5,296,277 (Wilson et al.), column 11, at a surface depression area coverage of 6% with depressions of $16900/in^2$ ($2619/cm^2$) at a density of 130 lines per inch (51 lines per cm). |
| L2 | Particle filled, Embossed Release Liner as described in U.S. Pat. No. 5,296,277 (Wilson et al.), column 11, at a surface depression area coverage of 16% with depressions of $28900/in^2$ ($4480/cm^2$) at a density of 170 lines per inch (67 lines per cm). |
| F1 | A cast, opaque, white PVC film with a thickness of 51 micrometers with a 0.5-1.0 micrometer thick layer of primer |
| F2 | Graphic film available from 3M Company, Saint Paul MN, as 3M CONTROLTAC Graphic Film with COMPLY Adhesive 180mC |
| O1 | Overlaminate film available from 3M Company, Saint Paul MN, as 3M SCOTCHCAL Gloss Overlaminate 8518 |

Slide Test

The Slide Test evaluated the slideability of a material on a substrate. The substrate was a pre-painted 12 in×12 in (4.7 cm×4.7 cm) aluminum panel from ALUMET SUPPLY (Parsippany, NJ Branch). The aluminum was pre-painted with white acrylic paint.

Procedure for Slide Test

First, the liner was removed from graphic film to expose the adhesive. Next, the adhesive side of graphic film was applied to the substrate panel (lightly set on panel no pressure). Next, the sample was moved around the substrate panel by lifting one end of the material and pulling it across the substrate. Then a slide ranking level was assigned based on slideability and tack of the graphic film (ranking levels are below). Two separate evaluators were used and the average of the result for each sample recorded, using the following rankings:

Level 1: No slideability (no slide side to side on the substrate, high tack, film adhered to substrate)
Level 2: Low slideability and moderate tack (wrinkling noticed when force was applied to break the adhesion)
Level 3: Moderate slideability and moderate tack (slight wrinkling noticed when force was applied to break the adhesion)
Level 4: Moderate slideability and low tack (slid after force was applied horizontally to break the adhesion)
Level 5: Maximum slideability (slid freely without adhering to the substrate)

Coefficient of Friction Slide Test

The Coefficient of Friction Slide Test evaluated the slideability of a material. The test equipment used was an I-MASS PEEL TESTER SP-2100 (10 lb/5 kg load cell) available from IMASS INC located in Accord, MA. The 7.6 cm×20.3 cm samples were conditioned for 24 hours at 23° C.+/−2° C. and 50+/−5% RH. The IMASS sled (201 grams) was wrapped with the liner that was removed from F2, paper side of liner wound inwards. An additional 800-gram weight was added to the sled. The IMASS sled was secured by attaching a tether (fishing line) from the sled to the load cell. The tether was around 6.5 inches (16.5 cm) in length.

Procedure for Coefficient of Friction Slide Test

The liner was removed from film sample so the adhesive was exposed. Then the sample was placed on a platen so the adhesive side was facing up. The front end of the sample was then taped down to the platen. A sled was placed so that its starting position was just before the sample and partially on the tape. The sled was then dragged across the adhesive side of the sample at a test speed of 300 in/min (0.127 meters/sec), and the results were given recorded in grams.

Example 1—Overlaminated Printed Structured Film (E1)

A second pattern was embossed into the release liner (L1) by passing the release liner between a smooth silicone rubber roll and an engraved metal roll. This produced an array of surface protrusions with 60 degrees draft angle in a square lattice with 390 microns spacing and 13~14 microns in height 40 microns in width on the particle filled side of the release liner.

A pressure sensitive adhesive solution (A1) was slot die coated and dried onto the particle filled side of the embossed release liner using a continuous coating/dryer line. This produced an adhesive coated embossed release liner. Adhesive thickness when dried was 30 microns. The adhesive was dried, at 93° C. for 54 seconds. The exposed adhesive side of the adhesive coated embossed release liner was laminated at room temperature to film F1 forming a Structured Adhesive Film.

The Structured Adhesive Film was ink jet printed using a Roland SOLJET PRO 4 XR-640 high-volume printer (Roland DGA Corp. Irvine, CA) with solvent ink available as ECO-SOL MAX 2 from Roland DGA. The printer was setup using 45% ink laydown. The ink lay down consisted of a solvent based pigment combination that equaled 45% ink laydown and was achieved by using 45% black pigment. The film was aged for 24 hours at room temperature. O1 was laminated to the film side of the printed Structured Adhesive Film. This generated an Overlaminated Printed Structured Adhesive Film. The material was tested using the Slide Test described above. See Table 1 for results.

Comparative Example 1 (CE1)

Comparative Example 1 was film F2, unprinted. The material was tested using the Slide Test and the Coefficient of Friction Slide Test described above. See Table 1 and Table 2 for results.

Example 2—Overlaminated Printed Structured Film (E2)

The Structured Adhesive Film from Example 1 was processed the same as in Example 1 except that the ink laydown was 100% and consisted of cyan pigment. The material was tested using the Slide Test described above. See Table 1 for results.

Example 3—Overlaminated Printed Structured Film (E3)

The Structured Adhesive Film from Example 1 was processed the same as in Example 1 except that the ink laydown was 150% and consisted of a solvent content level that equaled 150% and was constructed of 100% cyan and 50% magenta pigments. The material was tested using the Slide Test described above. See Table 1 for results.

Example 4—Overlaminated Printed Structured Film (E4)

The Structured Adhesive Film from Example 1 was processed the same as in Example 1 except that the ink laydown was 200% and consisted of 100% cyan and 100% magenta pigments. The material was tested using the Slide Test described above. See Table 1 for results.

Example 5—Overlaminated Printed Structured Film (E5)

The Structured Adhesive Film from Example 1 was processed the same as in Example 1 except that the ink laydown was 250% and consisted of 50% cyan, 50% magenta, 50% yellow and 100% black pigments. The material was tested using the Slide Test described above. See Table 1 for results.

Example 6—Overlaminated Printed Structured Film (E6)

A second pattern was embossed into the release liner (L2) by passing the release liner between a smooth silicone rubber roll and an engraved metal roll. This produced an array of surface protrusions with 60 degrees draft angle in a square lattice with 390 microns spacing and 13~14 microns in height and 40 microns in width on the particle filled side of the release liner.

A pressure sensitive adhesive solution (A1) was slot die coated and dried onto the particle filled side of the embossed release liner using a continuous coating/dryer line. This produced an adhesive coated embossed release liner. Adhesive thickness when dried was 30 microns. The adhesive was dried, at 93° C. for 54 seconds. The exposed adhesive side of the adhesive coated embossed release liner was laminated at room temperature to film F1 forming a Structured Adhesive Film.

The Structured Adhesive Film was ink jet printed using a Roland SOLJET PRO 4 XR-640 high-volume printer (Roland DGA Corp. Irvine, CA) with solvent ink available as ECO-SOL MAX 2 from Roland DGA. The printer was setup using 45% ink laydown. The ink laydown consisted of a solvent content level that equaled 45% and was constructed of black pigment. The film was aged for 24 hours at room temperature. O1 was laminated to the film side of the printed Structured Adhesive Film. This generated an Overlaminated Printed Structured Film. The material was tested using the Slide Test described above. See Table 1 for results.

Example 7—An Overlaminated Printed Structured Film (E7)

The Structured Adhesive Film from Example 6 was processed the same as in Example 6 except that the ink laydown was 100% and consisted of cyan pigment. The material was tested using the Slide Test described above. See Table 1 for results.

Example 8—An Overlaminated Printed Structured Film (E8)

The Structured Adhesive Film from Example 6 was processed the same as in Example 6 except that the ink laydown was 150% and consisted of a solvent content level that equaled 150% and was constructed of 100% cyan and 50% magenta pigments. The material was tested using the Slide Test described above. See Table 1 for results.

Example 9—An Overlaminated Printed Structured Film (E9)

The Structured Adhesive Film from Example 6 was processed the same as in Example 6 except that the ink laydown was 200% and consisted of 100% cyan and 100% magenta pigments. The material was tested using the Slide Test described above. See Table 1 for results.

Example 10—An Overlaminated Printed Structured Film (E10)

The Structured Adhesive Film from Example 6 was processed the same as in Example 6 except that the ink laydown was 250% and consisted of 50% cyan, 50% magenta, 50% yellow and 100% black pigments. The material was tested using the Slide Test described above. See Table 1 for results.

TABLE 1

| Slide results from Slide Test | | |
|---|---|---|
| Example | Slide Rating (1-5) | Ink Laydown (%) |
| E1 | 4.5 | 45 |
| CE1 | 4.5 | 0 |
| E2 | 4.0 | 100 |
| E3 | 3.5 | 150 |
| E4 | 2.0 | 200 |
| E5 | 3.0 | 250 |
| E6 | 5.0 | 45 |
| E7 | 4.5 | 100 |
| E8 | 3.5 | 150 |
| E9 | 3.5 | 200 |
| E10 | 4.0 | 250 |

Example 11—An Overlaminated Printed Structured Film (E11)

The Structured Adhesive Film from Example 1 was ink jet printed using an OKI data COLORPAINTER M-64s printer (available from OKI Data Corporation, Tokyo, Japan) with eco solvent ink available as 3M SX Ink series from OKI (available from OKI Data Corporation, Tokyo, Japan). The printer was setup using 250% ink laydown. The ink lay down consisted of a solvent based pigment combination that equaled 250% ink laydown and was achieved by pigment combinations of 50% yellow, 50% magenta, 50% Cyan and 100% black. The film was aged for 24 hours at room temperature. O1 was laminated to the film side of the printed Structured Adhesive Film. This generated an Overlaminated Printed Structured Film. The material was tested using the Coefficient of Friction Slide Test described above. See Table 2 for results.

Example 12—An Overlaminated Printed Structured Film (E12)

The Structured Adhesive Film from Example 6 was ink jet printed using an OKI data COLORPAINTER M-64s printer (available from OKI Data Corporation, Tokyo, Japan) with eco solvent ink available as 3M SX Ink series from OKI (available from OKI Data Corporation, Tokyo, Japan). The printer was setup using 250% ink laydown. The ink lay down consisted of a solvent based pigment combination that equaled 250% ink laydown and was achieved by pigment combinations of 50% yellow, 50% magenta, 50% Cyan and 100% black. The film was aged for 24 hours at room temperature. O1 was laminated to the film side of the printed Structured Adhesive Film. This generated an Overlaminated Printed Structured Film. The material was tested using the Coefficient of Friction Slide Test described above. See Table 2 for results.

Comparative Example 2—An Overlaminated Printed Structured Film (CE2)

The Structured Adhesive Film F2 was ink jet printed using an OKI data COLORPAINTER M-64s printer (available from OKI Data Corporation, Tokyo, Japan) with eco solvent ink available as 3M SX Ink series from OKI (available from OKI Data Corporation, Tokyo, Japan). The printer was setup using 250% ink laydown. The ink lay down consisted of a solvent based pigment combination that equaled 250% ink laydown and was achieved by pigment combinations of 50% yellow, 50% magenta, 50% Cyan and 100% black. The film was aged for 24 hours at room temperature. O1 was laminated to the film side of the printed Structured Adhesive Film. This generated an Overlaminated Printed Structured Film. The material was tested using the Coefficient of Friction Slide Test described above. See Table 2 for results:

TABLE 2

Slide results from Coefficient of Friction Slide Test

| Example | Slide Value (grams) | Ink Laydown (%) |
|---------|---------------------|-----------------|
| E11 | 176.9 | 250 |
| E12 | 143.2 | 250 |
| CE1 | 128.3 | 0 |
| CE2 | 486.9 | 250 |

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A film-based article comprising:
a film layer having first and second major sides;
an adhesive layer comprising a first surface adjacent to the second major side of the film and a second surface opposite the first surface, wherein the second surface of the adhesive layer comprises a structured surface comprising a plurality of outwardly extending protrusions, each having a base, wherein the bases of the plurality of protrusions comprise at least 6 percent up to 25% of a total surface area of the second surface of the adhesive layer, and wherein the second surface of the adhesive layer further comprises at least one channel;
an ink layer applied to the first major side of the film layer at an ink laydown of at least 100 percent, and
an overlaminate film over the ink layer.

2. The film-based article of claim 1, wherein the ink layer comprises a solvent-based ink.

3. The film-based article of claim 1, wherein the ink layer applied to the first major side of the film layer is constructed of at least two different pigments.

4. The film-based article of claim 1, wherein the film layer is at least one of optically clear, transparent, translucent, opaque, and colored.

5. The film-based article of claim 1, wherein the film layer comprises at least one of vinyl, polyvinyl chloride, plasticized polyvinyl chloride, polyurethane (PU), polyethylene, polypropylene, fluororesin, polyethylene terephthalate (PET), polyethylene terephthalate glycol (PETG) polymethylmethacrylate (PMMA), polycarbonate (PC), and acrylonitrile butadiene styrene (ABS).

6. The film-based article of claim 1, wherein the film layer further comprises at least one additional functional or decorative layer.

7. The film-based article of claim 6, wherein the at least one functional or decorative layer comprises a primer layer located on the second major side of the film layer and is in contact with the adhesive layer.

8. The film-based article of claim 1, wherein the bases of the plurality of protrusions comprise between 9 percent and 25 percent of the total surface area of the second surface of the adhesive layer.

9. The film-based article of claim 1, wherein the at least one channel comprises an array of channels.

10. The film-based article of claim 1, wherein the at least one channel comprises an irregular array of channels.

11. A film-based article comprising:
a film layer having first and second major sides;
an adhesive layer comprising a first surface adjacent to the second major side of the film and a second surface opposite the first surface, wherein the second surface of the adhesive layer comprises a structured surface comprising:
a plurality of outwardly extending protrusions, each having a base, wherein the bases of the plurality of protrusions comprise at least 6 percent up to 25% of a total surface area of the second surface of the adhesive layer; and an array of channels; and
a solvent-based ink coating applied to the first major side of the film layer, wherein the solvent-based ink coating has an ink laydown of at least 100 percent, and
an overlaminate film over the ink coating.

12. A method of applying a film-based article to a substrate, comprising the steps of:
- positioning a film-based article adjacent to an outer surface of a substrate, wherein the film-based article comprises:
  - a film layer having first and second major sides;
  - an adhesive layer comprising a first surface adjacent to the second major side of the film and a second surface opposite the first surface, wherein the second surface of the adhesive layer comprises a structured surface comprising a plurality of outwardly extending protrusions, each having a base, wherein the bases of the plurality of protrusions comprise at least 6 percent up to 25% of a total surface area of the second surface of the adhesive layer, and wherein the second surface of the adhesive layer further comprises at least one channel;
  - a release liner adjacent to the second surface of the adhesive layer; and
- an ink layer applied to the first major side of the film layer at an ink laydown of at least 100 percent, and an overlaminate film over the ink layer;
- removing the release liner from the second surface of the adhesive layer; and
- applying the second surface of the adhesive layer to the outer surface of the substrate.

* * * * *